(12) United States Patent
Battini et al.

(10) Patent No.: US 10,182,120 B2
(45) Date of Patent: Jan. 15, 2019

(54) METHOD FOR ASSIGNING A TAG WITH AN ACTION WITHIN A NETWORK, RESPECTIVE NETWORK AND CONTROL DEVICE

(71) Applicant: THOMSON LICENSING, Issy les Moulineaux (FR)

(72) Inventors: Fabien Battini, Thorigné-Fouillard (FR); Franck Abelard, Saint Armel (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/507,764

(22) PCT Filed: Aug. 20, 2015

(86) PCT No.: PCT/EP2015/069179
§ 371 (c)(1),
(2) Date: Mar. 1, 2017

(87) PCT Pub. No.: WO2016/034430
PCT Pub. Date: Mar. 10, 2016

(65) Prior Publication Data
US 2017/0295245 A1    Oct. 12, 2017

(30) Foreign Application Priority Data
Sep. 1, 2014   (EP) ..................................... 14306343

(51) Int. Cl.
*H04L 29/08*   (2006.01)
*H04W 4/04*   (2009.01)
(Continued)

(52) U.S. Cl.
CPC ............ *H04L 67/146* (2013.01); *G06F 21/35* (2013.01); *H04B 5/0062* (2013.01); *H04L 67/26* (2013.01);
(Continued)

(58) Field of Classification Search
CPC ........ H04B 5/00; H04B 5/0062; H04L 67/146
(Continued)

(56) References Cited

U.S. PATENT DOCUMENTS

2007/0186107 A1 *  8/2007  Sonetaka ............... G06F 21/43
                                                                  713/170
2013/0134213 A1    5/2013  Pallakoff et al.
(Continued)

FOREIGN PATENT DOCUMENTS

| | | |
|---|---|---|
| CN | 102968864 | 3/2013 |
| EP | 1516269 | 9/2009 |
| KR | 102006108803 | 10/2006 |

OTHER PUBLICATIONS

Anonymous, "NFC Task Launcher", http://www.launcher.tagstand.com, Aug. 27, 2013, pp, 1-2.
(Continued)

*Primary Examiner* — Ayodeji O Ayotunde
(74) *Attorney, Agent, or Firm* — Jeffrey M. Navon

(57) ABSTRACT

The method for assigning a tag (T) with an action for a network device (N) within a network comprising a management server (M), a control device (S) and the network device reads the tag with the control device; the tag transmitting a unique tag ID and a URL to the control device. The control device (S) reads the URL and connects with the management server (M), in case the tag has no action assigned, an action to be performed by the network device (N) is selected for the tag from a list on the control device, the management server is informed about the selected action. The management
(Continued)

server stores the selected action in a memory of the management server, and the control device communicates with the network device (N) to inform the network device (N) to perform the action.

15 Claims, 2 Drawing Sheets

(51) Int. Cl.
    *G06F 21/35*     (2013.01)
    *H04B 5/00*     (2006.01)
    *H04W 4/80*     (2018.01)

(52) U.S. Cl.
    CPC .............. *H04L 67/34* (2013.01); *H04W 4/043* (2013.01); *G06F 2221/2115* (2013.01); *H04W 4/80* (2018.02)

(58) Field of Classification Search
    USPC ........................................................ 455/41.1
    See application file for complete search history.

(56) References Cited

U.S. PATENT DOCUMENTS

| | | | |
|---|---|---|---|
| 2013/0215467 A1* | 8/2013 | Fein ...................... | G06F 3/1204 358/1.15 |
| 2013/0178189 A1 | 11/2013 | Balsan et al. | |
| 2013/0303085 A1* | 11/2013 | Boucher ............... | H04W 4/008 455/41.1 |

OTHER PUBLICATIONS

Clark, "Samsung updates TecTiles NFC app", NFC World, http:www.nfcworld.com/2012/10/26/320783/samsung-updates-tectile-nfc-app/, Oct. 26, 2012, pp. 1-3.

Anonymous, NFC Tags for Android—How to use NFC tags, http://www.tagsfordroid.com/about-nfc-tags/, Aug. 27, 2013, pp. 1-3.

* cited by examiner

METHOD FOR ASSIGNING A TAG WITH AN ACTION WITHIN A NETWORK, RESPECTIVE NETWORK AND CONTROL DEVICE

This application claims the benefit, under 35 U.S.C. § 365 of International Application PCT/EP2015/069179 filed Aug. 20, 2015, which was published in accordance with PCT Article 21(2) on Mar. 10, 2016, in English, and which claims the benefit of European Application No. 14306343.6 filed Sep. 1, 2014. The European and PCT applications are expressly incorporated by reference herein in their entirety for all purposes.

TECHNICAL FIELD

The present disclosure relates to the field of communications networks, for example to a home network including a residential gateway, adapted to operate via a broadband connection with a service provider network.

BACKGROUND

Home networks have become part of everyday life for many customers. A home network consists of a range of heterogeneous devices, which means that the home network is made up of different kinds of devices. All these devices need to communicate with each other. For this interconnection multiple solutions are available: The home network uses a mixture of solutions, such as wireless and wired network connections. Combining these devices creates a network that allows users to share information and to control devices in the home. Some examples of networked devices in the home are for example residential gateways, set-top boxes, TVs, personal computers, tablet PCs, smart phones, network-attached storage (NAS) devices, printers and game consoles.

In software architecture, Publish/Subscribe is a messaging pattern where senders of messages, called publishers, do not program the messages to be sent directly to specific receivers, called subscribers. Instead, published data is multi-casted, without knowledge of what, if any, subscribers there may be. Similarly, subscribers subscribe to particular data, and only receive messages that are of interest, without knowledge of what, if any, publishers there are. Entities connected within a Publish/Subscribe-based network communicate on 'Topics' and value changes of its parameters that are published to the ones subscribed.

DDS (Data Distribution Service for Real-Time Systems) is a standard governed by the Object Management Group (OMG). It describes a data-centric publish-subscribe middleware that can be used to build distributed real-time systems. Since its formal adoption as an OMG standard in the year 2004, it has become a popular technology used in many different industries such as the airline/aviation industry, the automotive industry, the military, etc. Several commercial and open-source implementations of the DDS standard exist.

Near field communication (NFC) is a set of well-established standards for smartphones and similar mobile devices to establish radio communication with each other by bringing them into contact proximity. NFC in particular allows communication between an NFC device and an unpowered NFC chip, known for example as a "tag" or an "NFC tag". An NFC tag can be paired with an NFC enabled device, e.g. a respective smartphone, to automate a task, for example to launch an application or to execute a number of commands. The NFC standards allow a large variety of applications.

Radio-frequency identification (RFID) is a wireless non-contact use of radio-frequency electromagnetic fields to transfer data, for example for the purpose of automatically identifying and tracking a tag attached to an object. The tag contains electronically stored information.

SUMMARY

A method for assigning a tag with an action for a network device within a network, which includes a management server, a control device and the network device, comprises: reading the tag with the control device, the tag transmitting a unique tag identification number (UID) and a uniform resource locator (URL) to the control device; the control device reading the URL and connecting with the management server; in case the tag has no action assigned, selecting an action to be performed by the network device for the tag from a list on the control device; informing the management server about the selected action, to enable the management server to store the selected action in a memory of the management server; and the control device communicating with the network device (N) to inform the network device (N) to perform the action. The tag is in particular a read-only tag, e.g. a passive NFC tag or a passive RFID tag and comprises data being programmed within a factory and not being customized for a specific user.

In an aspect of the disclosure, the network is a publish/subscribe network and the control device and the network device include a management application for communicating with each other via publish/subscribe messages, and the list is included in the management application of the control device. The selected action to be performed by the network device is stored in the control device. The management server is located for example in the Internet or runs as a service on a device of a home network including the control device and the network device. The control device is in particular a mobile device comprising a Wi-Fi node, a user interface including a display, and a tag reader.

In a further aspect of the disclosure, the network device is a device of a home automation system and operates in accordance with a Zigbee or a ZWave protocol.

The publish/subscribe network is advantageously a topic-based publish/subscribe network and utilizes a Data Distribution Service for Real-Time Systems (DDS).

The publish/subscribe network comprises a tag, a control device comprising an reader for reading the tag, a network device and a management server, wherein the management server is adapted to store a function being assigned to the tag and to be performed by the network device, and the control device triggers the function of the network device by reading the tag.

A non-transitory program storage medium is readable by a computer and comprises computer executable program code for performing the method.

The control device includes a processor, a tag reader and a management application, wherein the processor is adapted to read a tag of a network device with the tag reader, the tag transmitting a unique tag identification number and a uniform resource locator to the control device. The control device reads the URL and connects with a management server. In case the tag has no action assigned, the control device selects an action for the tag to be performed by the network device from a list included in the control device and being presented by the management application, and informs the management server about the selected action, to enable the management server to store the selected action in a memory of the management server. The control device communicates further with the network device to inform the network device to perform the action.

BRIEF DESCRIPTION OF THE DRAWINGS

Exemplary embodiments of the present disclosure are explained in more detail below by way of example with reference to schematic drawings, which show.

DETAILED DESCRIPTION OF PREFERRED EMBODIMENTS

In the following description, a network comprising a management server, a network device, a tag and a control device for controlling the network device, as well as a method for assigning the tag with an action for the network device are described. For purposes of explanation, numerous specific details are set forth in order to provide a thorough understanding of the embodiments. It will be evident, however, to one skilled in the art that the present disclosure may be practiced without these specific details.

Figure 1:
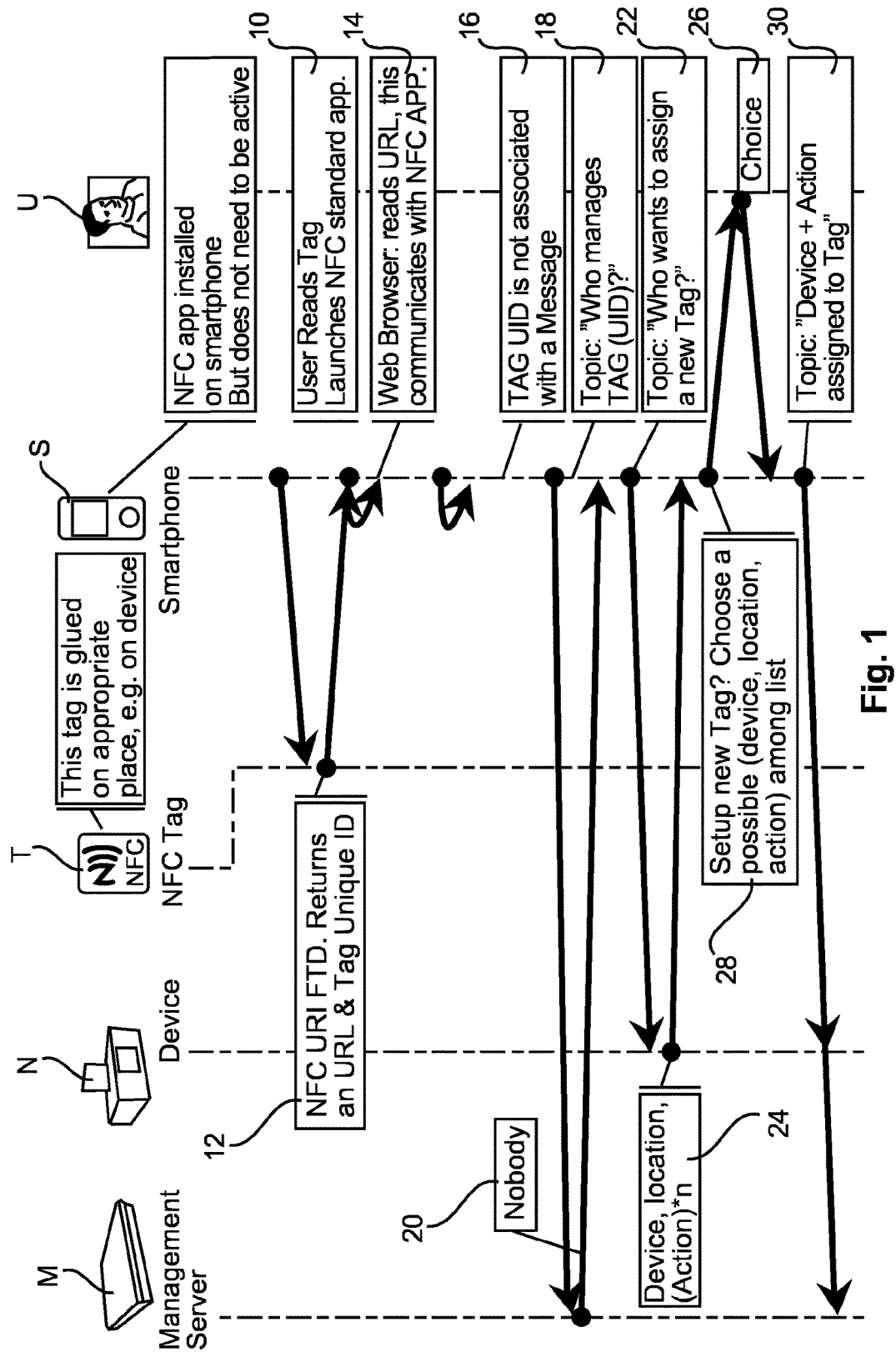
FIG. 1 a publish/subscribe network comprising a management server, a network device and a control device for assigning an NFC tag with an action to be performed by the network device, and FIG. 2 the publish/subscribe network of FIG. 1 triggering an assigned action of the network device by means of the NFC tag.

As depicted in FIG. 1, the network comprises a management server M, a network device N, a tag T and a control device S. The tag T is in particular an NFC tag, and the network device N, the NFC tag T and the control device S are for example a part of a home network of a user U. The management server M is an Internet-enabled device comprising an Internet address and uses messages for communicating with the other devices of the network. The management server M is available over a wide area network, e.g. the Internet, or is arranged as a service on a device running in the home network, for instance on a gateway, on a PC or on a TV set. The network is in particular a publish/subscribe network and uses publish/subscribe messages for communicating with the other devices of the publish/subscribe network.

The NFC tag T is in particular a passive NFC tag comprising data being programmed within a factory and not being customized for a specific user. The content of the NFC tag therefore cannot be updated by the user. A passive NFC tag does not require a power source and can therefore be manufactured very economically as a low cost item. The data of the NFC tag include in a preferred embodiment a tag identification number and the Internet address of the management server M. In another embodiment, the NFC tag holds more precise information: a device type and/or an action type for a network device to be controlled by the control device S. In this case, the possible choices can be predefined for a specific network device according to this information.

The network device N is for example an Internet-enabled device comprising a central processing unit (CPU) running an IP (Internet Protocol) stack, e.g. a smart TV or an AV (audio/video) server. Its software can be updated. Alternatively, the network device N is a home automation network device and a part of a subsystem within the publish/subscribe network, e.g. a home automation network using a ZigBee or a ZWave protocol, and comprises a simpler CPU not running an IP stack. In this case, the software of the network device N cannot be updated and the publish/subscribe network comprises a residential gateway or any other access gateway, which is used as a bridge between the home automation network and the Internet, e.g. the access gateway comprising a ZigBee interface and an IP interface. The access gateway is therefore able to work as a software bridge between a respective home automation protocol and the Internet protocol, so that, seen from outside of the publish/subscribe network, the behavior of the network device N of the home automation network is identical to the behavior of an Internet device. A control information sent to the access gateway can control correspondingly one or several home automation network devices.

The control device S is in particular an Internet-enabled mobile device comprising an IP address, for instance a smartphone or a tablet PC, and comprises a management application for connecting with the management server M. The control device S comprises an NFC tag reader and respective software for decoding an information being transmitted by the RFC tag T. The control device S comprises further a user interface with a display and a web browser for displaying HTTP (Hypertext Transfer Protocol) pages. The control device S uses in particular a wireless IP connection, e.g. Wi-Fi, for connecting to other devices of the publish/subscribe network: the network device N, an access gateway (not shown in FIG. 1) and/or the management server M. It is not necessary to have a direct connection between the control device S and the network device N: Both may be connected via the access gateway, e.g. the residential gateway of the home network. The software of the control device S can be updated.

The management server M and the devices N, S of the publish/subscribe network include each a management application and use publish/subscribe messages for communicating with each other. In a preferred embodiment, DDS (Data Distribution Service for Real-Time Systems) is used for sending and receiving of the publish/subscribe messages within the network.

A setup procedure for a new tag T, in particular an NFC tag T, within the publish/subscribe network is described with regard to FIG. 1. The new NFC tag T is fixed on an appropriate place, for example it is glued on the network device N being arranged within a domestic home of a user U.

The user U comprises a smartphone S including the management application.

The management application does not need necessarily to be active, when the reader reads the new NFC tag T with his smartphone S. When the smartphone S recognizes the new NFC tag T with its NFC reader, the management application is started, step 10. The NFC tag T transmits a uniform resource locator (URL) of the management server M and a unique identification number (UID) of the NFC tag T, step 12. A web browser of the smartphone S reads the URL and communicates with the management application, step 14. The smartphone S recognizes that the UID is not associated with an NFC message because no action for the network device N is stored in the smartphone S, step 16, and asks the management server M: "who manages this NFC tag?", by transmitting the UID to the management server M, step 18. The management server M returns in this case the information: unknown NFC tag, step 20.

The user U wants for example to setup the new NFC tag T by choosing an action for the device N, steps 22, 24. The user U then uses the management application of his smartphone S to setup the new NFC tag T by choosing an action and the network device N and/or a location from a list being presented by the management application, steps 26, 28. The user U selects for example an operation of the network device N as an action. After the selection, the management application of the smartphone S transmits this information to the management server M: device and action assigned to NFC tag T, step 30. The management server M stores the selected action in a memory of the management server.

After this setup procedure, the user U can start the action associated with the new NFC tag T simply by placing his smartphone S close to the NFC tag T, so that the smartphone S can recognize the NFC tag T. Because the NFC tag T was setup with the smartphone S, the management application of the smartphone can immediately start the action after the recognition of the NFC tag T as the management application has stored the associated action in the smartphone S during the setup procedure. If the user uses a different device for reading the NFC tag T, for example another smartphone S2, the smartphone S2 does not recognize the new NFC tag T in this case, and therefore asks the management server M about the purpose of the NFC tag T. The management server M informs the smartphone S2 then in a subsequent step about the purpose of the NFC tag T.

In a variation of the setup, a new NFC tag may already include a more precise information: a device type and/or an action type, being stored in the NFC tag for example during manufacturing of the NFC tag. In this case, the possible choices for the device type and/or action are filtered in the list according to the information as included in the NFC tag, when the list is provided by the management application to the user U, for setting up this NFC tag.

Figure 2:
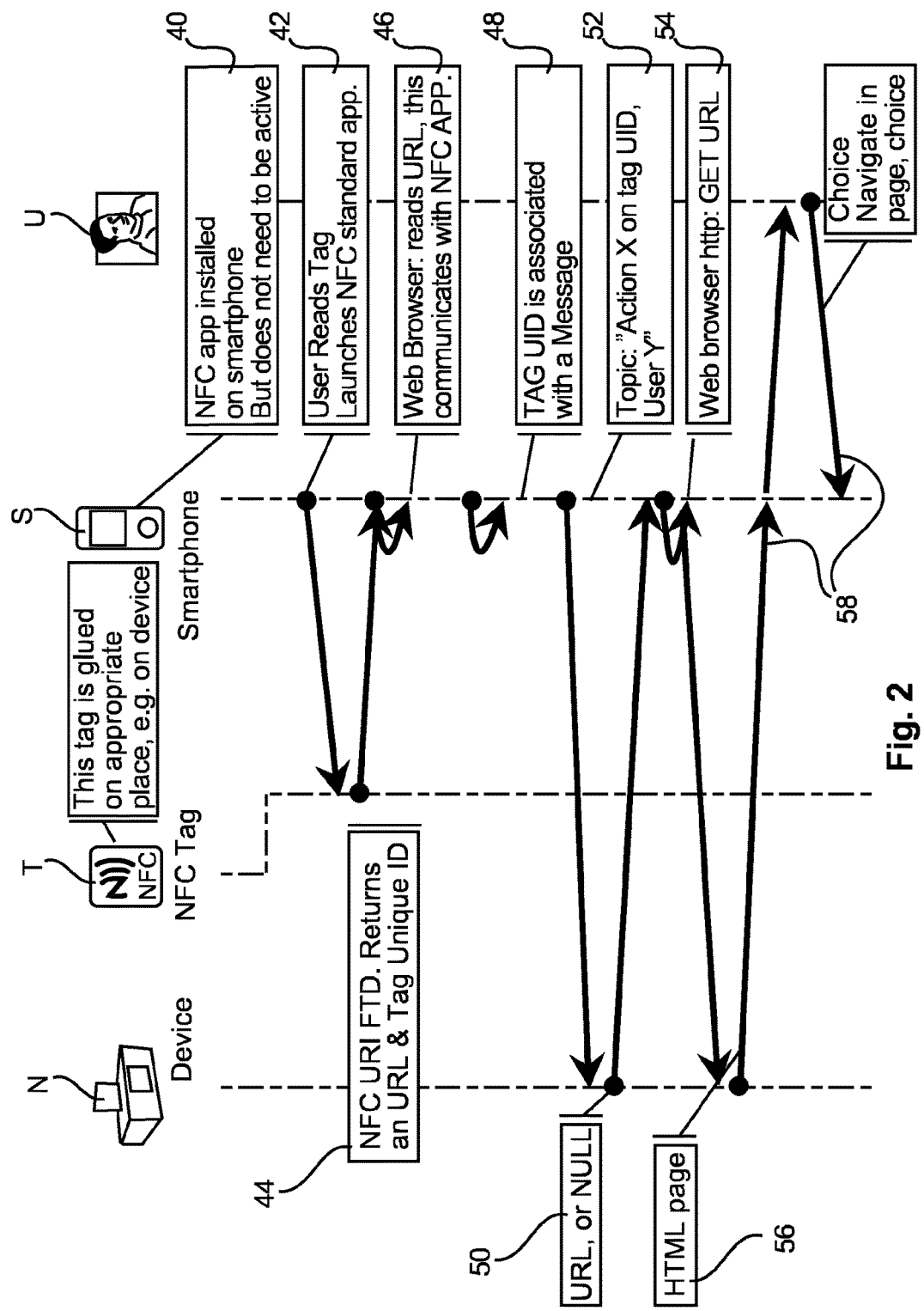

A subsequent usage of the NFC tag T for triggering the assigned action of the network device N is described with regard to FIG. 2. On the smartphone S of the user U, the management application is installed, as described above, step 40. For starting the wanted action of the network device N, the user places the smartphone S close to the NFC tag T being tagged to the network device N, to read the NFC tag T. When the NFC reader of the smartphone S recognizes the NFC tag T, the management application is started, step 42. The NFC tag T communicates with the smartphone S and transmits the URL of the management server and its UID, step 44. In a further step 46, the web browser of the smartphone S reads the URL and communicates with the management application. The management application has stored the action associated with the NFC tag T, step 48, or alternatively, requests the action associated with the NFC tag T from the management server. In a further step, the management application of the smartphone S contacts the network device N by using the URL or a MAC (Media Access Control) address of the network device N, step 50. The management application of the smartphone S then informs the management application of the network device N to perform the action associated with the NFC tag T, step 52. The action is then performed by the network device N, for example by providing an information to the user U, steps 54-58.

The network device N is for example a set-top box and the action associated with the NFC tag T the command: "follow me". An example for an application is: the user U is viewing pay TV in his living room being received by the network device N. After some time, the user wants to view the pay TV program in a different room, and he therefore places his smartphone S close to the NFC tag T to read the NFC tag T. The NFC tag T transmits its UID to the smartphone S, and the management application of the smartphone S recognizes the action being associated with the NFC tag T. The pay TV program is now streamed from the network device N to the smartphone S, so that the user U can use the pay TV program on the smartphone S. In a further step, the user U reads an NFC tag of a second set-top box being arranged in the other room, which NFC tag has associated the same action as the NFC tag T. The pay TV program is then streamed to the second set-top box, so that the user can now see the pay TV program on a television set being connected with the second set-top box in the other room of the user U. The playback on the smartphone S is correspondingly terminated.

In another embodiment, the network device N is a smart light of a home automation system, which can be controlled by using the ZigBee protocol. Also, shutters of a domestic home can be controlled via respective NFC tags by using the ZWave protocol. The residential gateway of the home network therefore includes in addition to the WIFI interface a ZigBee and a ZWave interface for performing an action on the smart light or on the shutter. The NFC tag associated with the smart light has for example the action: switch-off or switch-on the light. When the user U reads the NFC tag associated with the smart light, the action associated with this NFC tag is recognized by the management application of the smartphone, and via the residential gateway of the home network, the light is switched-off when the light is on or the light is switched-on when the light is off, by sending a respective command from the residential gateway to the smart light via the ZigBee protocol.

Using a publish/subscribe network of this kind, the setup of a tag is easy and a wide range of applications can be associated with the tag. A user can control a multitude of network devices by simply reading the tag being associated with the respective network device. The tag does not need to be customized for a specific usage and can be cheap therefore.

Also other embodiments of the disclosure may be utilized by one skilled in the art without departing from the scope of the present disclosure. The network is in a preferred embodiment a publish/subscribe network utilizing DDS, but also any other publish/subscribe network, e.g. using D-Bus, a message-bus system for inter-process communication, may be used according to the disclosure. The method may allow also to assign multiple actions for a tag, which actions are performed when reading the tag with the control device. Further, not only an NFC tag or a RFID tag may be used, but also any other tag. The present disclosure resides therefore in the claims herein after appended.

The invention claimed is:

1. A method for assigning a tag with an action for a network device within a network comprising a management server, a control device and the network device, the tag comprising a unique tag identification number and a uniform resource locator (URL) of the management server, the action being related to an operation of the network device, wherein the network is a publish/subscribe network and the control device and the network device include a management application for communicating with each other via publish/subscribe messages and wherein the method comprises reading the tag by the control device, reading the URL by the control device and connecting the control device with the management server, in case the tag has no action assigned, selecting an action to be performed by the network device for the tag from a list included in the management application of the control device, and informing the management server about the selected action, to enable the management server to store the selected action in a memory of the management server, and informing the network device to perform the action.

2. The method of claim 1, wherein the selected action to be performed by the network device is stored in the control device.

3. The method of claim 1, wherein the tag is a read-only tag.

4. The method of claim 1, wherein the control device is a mobile device comprising a Wi-Fi node, a user interface including a display, and a tag reader.

5. The method of claim 4, wherein the control device is a mobile phone or a tablet PC.

6. The method of claim 1, wherein the network device is a device of a home automation system and operates in accordance with a Zigbee or a ZWave protocol.

7. A network comprising a control device including a tag reader for reading a tag, a network device and a management server for performing a method according to claim 1.

8. The network of claim 7, wherein the management server is adapted to store a function being assigned to the tag and to be performed by the network device, and the control device triggers the function of the network device by reading the tag.

9. The network of claim 7, wherein the tag is a passive NFC tag or a passive RFID tag and comprises data being programmed within a factory and not being customized for a specific user.

10. A non-transitory program storage medium, readable by a computer and comprising computer executable program code for performing a method in accordance with claim 1.

11. A control device comprising a tag reader and including a management application for performing a method in accordance with claim 1.

12. A control device including a processor, a tag reader and a management application, wherein the control device is adapted to communicate with a network device via publish/subscribe messages and wherein the processor is adapted to read a tag of a network device with the tag reader, the tag comprising a unique tag identification number and a uniform resource locator of a management server, to read the uniform resource locator of the management server in the tag and connect with the management server, in case the tag has no action related to an operation of the network device assigned, to select an action for the tag to be performed by the network device from a list included in the control device and being presented by the management application, to inform the management server about the selected action, to enable the management server to store the selected action in a memory of the management server, and to inform the network device to perform the action.

13. The control device of claim 12, wherein the list is included in a management application of the control device.

14. The control device of claim 12, wherein the control device is a mobile device comprising a Wi-Fi node and a user interface including a display.

15. The method of claim 3, wherein the tag is a passive near field communication tag or a passive radio-frequency identification tag.

* * * * *